US006644335B2

(12) United States Patent
Dvorak et al.

(10) Patent No.: US 6,644,335 B2
(45) Date of Patent: Nov. 11, 2003

(54) PRECISION ORIFICING FOR PILOT OPERATED CONTROL VALVES

(75) Inventors: Paul A. Dvorak, Sanford, NC (US); Gabriel G. Khairallah, Carrboro, NC (US); Chin T. Khaw, Apex, NC (US)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 09/902,240

(22) Filed: Jul. 10, 2001

(65) Prior Publication Data

US 2002/0074044 A1 Jun. 20, 2002

Related U.S. Application Data

(60) Provisional application No. 60/256,052, filed on Dec. 15, 2000.

(51) Int. Cl.[7] .......................... F15B 13/06; F16K 11/18

(52) U.S. Cl. ............................ 137/14; 60/427; 60/452; 137/112; 137/636.2

(58) Field of Search .................. 60/427, 452; 137/112, 137/636.2

(56) References Cited

U.S. PATENT DOCUMENTS 4,256,142 A * 3/1981 Hancock ................ 137/596.13
4,345,435 A * 8/1982 Breeden ...................... 60/452
4,481,770 A 11/1984 Lohbauer et al.
4,530,376 A 7/1985 Chatterjea
5,067,389 A * 11/1991 St. Germain ................ 60/427
5,184,646 A 2/1993 Hori et al.
5,285,861 A 2/1994 Nakamura
5,426,874 A 6/1995 Nakata et al.
5,493,861 A * 2/1996 Friedrichsen ................ 60/452
5,528,911 A * 6/1996 Roth et al. .................... 60/452
5,642,616 A * 7/1997 Park ........................... 60/452
5,743,297 A 4/1998 Mueller
5,823,227 A 10/1998 Hori et al.
5,890,509 A * 4/1999 Becker et al. ................ 60/329
5,937,897 A 8/1999 Chatterjea et al.
6,082,107 A * 7/2000 Schniederjan et al. ........ 60/444
6,167,702 B1 * 1/2001 Schniederjan ................ 60/444
6,336,324 B1 * 1/2002 Schniederjan et al. ........ 60/444
6,374,605 B1 * 4/2002 Dvorak et al. ................ 60/452

* cited by examiner

*Primary Examiner*—Gerald A. Michalsky
(74) *Attorney, Agent, or Firm*—Diana L Charlton

(57) ABSTRACT

A fluid control system incorporates an orificing device between each of a plurality of pilot operated control valves in connection with a control device and a resolver. The pilot operated control valves are actuated by the control device to control different functions of a work machine. The actuation of the pilot operated control valves produces pressure flows that are sent to the respective resolver. The orificing devices include a plurality of steps that may be varied in size and shape to dampen the pressure flow to the respective resolver so that independent control for the pilot operated control valves is achieved. Additionally, a precision edge is defined within each of the orificing devices to control the flow of pressurized hydraulic fluid through the respective orificing device and maintain a consistent viscous drag therethrough independent of temperature and oil-viscosity variations.

10 Claims, 3 Drawing Sheets

PRECISION ORIFICING FOR PILOT OPERATED CONTROL VALVES

This application claims the benefit of prior provisional patent application Serial No. 60/256,052 filed Dec. 15, 2000.

1. TECHNICAL FIELD

This invention relates generally to the use of precision orificing that is specifically designed within a pilot control valve for a joystick, and, more particularly, to the ability to precisely determine the size, shape, and position of an orifice for improved flow response.

2. BACKGROUND

It is well known to utilize pilot control valves within a work machine, such as front end loaders and the like. The pilot control valves typically include a tiltable or rotatable joystick with a cam movable therewith. It is also conventional to provide a series of valves about the vertical axis of the cam, which, when the stems thereof are selectively depressed, allow a flow of fluid to actuate fluid motors for controlling various functions of the work machine.

It is also well known to utilize orifices within a hydraulic circuit to provide directional control of hydraulic fluid. For example, in U.S. Pat. No. 4,481,770 issued to Kenneth R. Lohbauer on Nov. 13, 1984, a fluid control system for controlling the torque of a fluid motor and varying the flow to the fluid motor is disclosed. A mechanism is used to control the torque and flow in proportion to the operator's input to a pilot operated control valve that controls the fluid pump. The mechanism controls the torque and flow of the fluid motor during both acceleration and deceleration of the fluid pump and eliminates the need for special, complicated control valves. This invention relates to the ability to change the flow characteristics of a pilot control valve through the use of various valves and orifices. However, the need to improve hydraulic flow response in a hydraulic circuit is not disclosed in the present invention. The ability to improve hydraulic flow response through the use of precision orificing provides numerous benefits. For example, a reduction of the variability of hydraulic flow response in relation to changes in hydraulic fluid temperature would be available. Additionally, different hydraulic flow responses may be achieved for different functions of the work machine controlled by a single joystick controller. Therefore, the ability to improve hydraulic flow response is important to increase efficiency and control for various functions of the work machine regardless of temperature and oil-viscosity variations.

The present invention is directed to overcoming the problems as set forth above.

SUMMARY OF THE INVENTION

In one aspect of the present invention, a method of dampening a pressure flow between a pilot operated control valve connected with a control device and a resolver is disclosed in a fluid control system having a supply of hydraulic fluid capable of being pressurized. The dampening method comprises the step of locating an orificing device directly in the pressure flow between the pilot operated control valve and the resolver.

In another aspect of the present invention, a fluid control system with a supply of hydraulic fluid capable of being pressurized comprises a control device. A pilot operated control valve is connected with the control device and is actuated by the control device to produce a pressure flow. A resolver is connected with the pilot operated control valve for receiving the pressure flow from the pilot operated control valve. An orificing device is located directly between the pilot operated control valve and the resolver. The orificing device includes means for dampening the pressure flow between the pilot operated control valve and the resolver.

The present invention includes the ability to improve hydraulic flow response through the use of an orificing device located directly between a pilot operated control valve and a resolver. The orificing device is capable of dampening a pressure flow between the pilot operated control valve and the resolver. This capability permits different hydraulic flow responses for different functions of a work machine controlled by a single control device.

DETAILED DESCRIPTION

Figure 1:
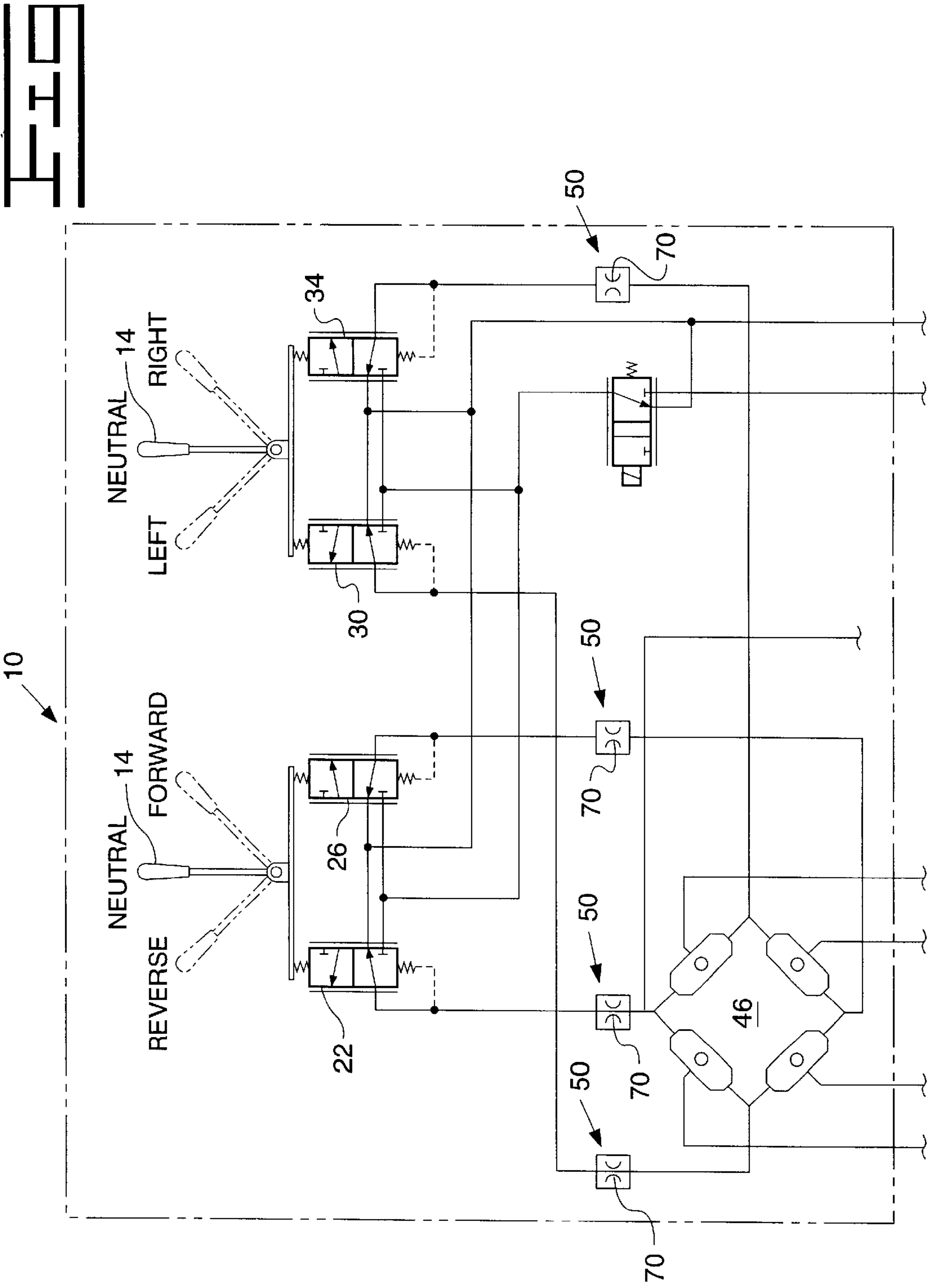
FIG. 1 is a partial hydraulic schematic for a work machine showing the present invention pilot control valve.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
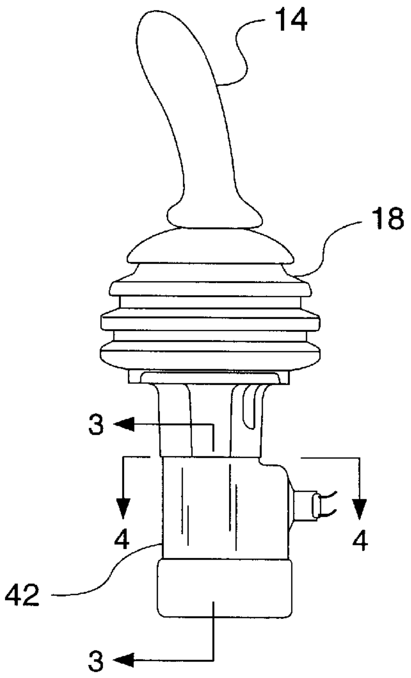
FIG. 2 is a pictoral side view of the surrounding structure enclosing the present invention pilot control valve.

Referring mainly to FIGS. 1–2, a fluid control system 10 is disclosed for a work machine (not shown). A joystick 14 in connection with the fluid control system 10 is movable in a plurality of directional positions, including reverse & forward (drive control) and left & right (steering control) (shown in FIG. 1). The joystick 14 is spring loaded to return from any of the directional positions to a neutral position located centrally on a joystick housing 18.

Figure 3:
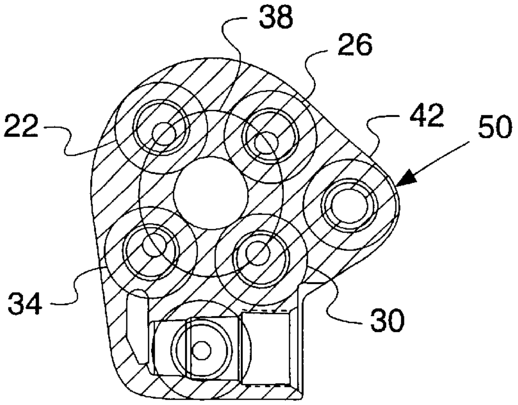
FIG. 3 is a sectional view taken along line 4—4 of FIG. 2 to show a top view of a plurality of pilot control valves and associated port.

The fluid control system 10 includes a plurality of pilot operated control valves 22,26,30,34 that are connected with the joystick 14 and are actuated in a well-known manner via a cam device 38 (seen in FIG. 3). The pilot operated control valves 22,26,30,34 are disposed within a housing 42. It should be understood that although a fluid control system 10 for a pilot operated drive/steering system is described in detail, any pilot operated control system may be utilized without exceeding the scope of the invention.

Figure 4:
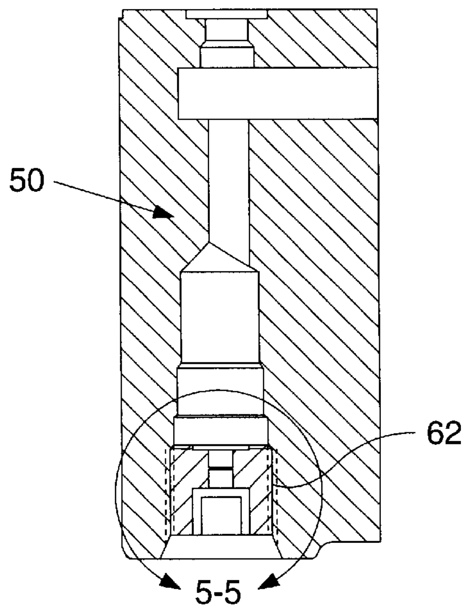
FIG. 4 is a sectional view taken along line 3—3 of FIG. 2 to show the port of FIG. 3 with an orifice disk located within a portion thereof.

A pilot signal resolver network 46 receives hydraulic pressure signals and flow from the pilot operated control valves 22,26,30,34 through signal ports, one of which is indicated by reference numeral 50 shown in FIGS. 3–4, located within the housing 42. The signal ports 50 are located directly between each of the pilot operated control valves 22,26,30,34 and the resolver network 46. Each of the signal ports 50 include a series of machined diameters. One of the diameters, indicated by reference numeral 62 is machined to include an inner thread.

Figure 5:
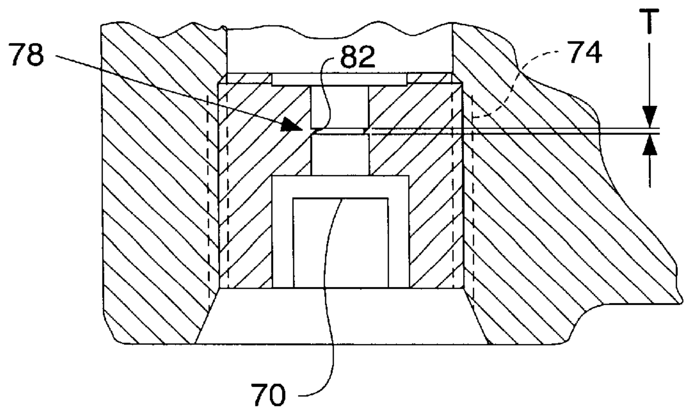
FIG. 5 is an enlarged view of the orifice disk encircled by 5—5 of FIG. 4.

An orifice disk 70, seen in FIGS. 4–5, is used as a means for dampening the pressure flow sent to the resolver network 46 from the pilot operated control valves 22,26,30,34. The orifice disk 70 includes an outer threaded diameter 74 that is threaded into the inner thread of diameter 62 of each signal port 50. Each orifice disk 70 has a series of steps 78 that include a precision edge 82 with a sharp edge shape which is machined to a 0.16 mm±0.04 mm thickness (T). It should be understood that each orifice disk 70 may incorporate different machined sizes and shapes for the steps 78.

Industrial Applicability

In operation, the joystick 14 is moved by an operator (not shown) so that the cam 38 actuates the pilot operated control valves 22,26,30,34. The actuation of the pilot operated control valves 22,26,30,34 sends a pressure signal to the resolver network 46 dependent upon the relative movement of the joystick 14. In response to the pressure signal from the pilot operated control valves 22,26,30,34, the resolver network 46 sends a pressure signal to one or more variable displacement pumps (not shown) which, in turn, allows a supply of hydraulic fluid to flow from a tank or reservoir (not shown) for controlling the direction of travel of the work machine (not shown) through a conventional drive and steering system (not shown).

In order to improve the performance and control of the fluid control system 10 incorporating the pilot operated control valves 22,26,30,34 and the resolver network 46, the orifice disk 70 is positioned directly between each of the pilot operated control valves 22,26,30,34 and the resolver network 46. The position of the orifice disk 70 dampens the pressure flow from the pilot operated control valves 22,26, 30,34 prior to reaching the resolver network 46. The dampening effect is dependent upon the size and shape of the steps 78 of the orifice disk 70. Therefore, independent orificing and flow response between the forward, reverse, right and left directional control of joystick 14 may be achieved when different sizes and shapes are used for the step 78 of the orifice disk 70. The independent orificing provides the operator (not shown) with a distinguished feel between the drive control (forward & reverse) and the steering control (left & right) of the joystick 14 for more accurate and productive operation.

The 0.16 mm nominal thickness of the precision edge 82 was determined via analysis of pilot operated control systems. A consistent viscous drag is achieved through the orifice disk 70 at the sharp shaped precision edge 82 that is independent of temperature and oil-viscosity variations to provide consistent flow response in the fluid control system 10. Therefore, the 0.16 mm±0.04 mm thickness of the precision edge 82 provides a smooth flow of hydraulic fluid through the orifice disk 70 irregardless of the size and shape of the surrounding steps 78 and is useful in most pilot operated control systems.

Other aspects, objects and advantages of this invention can be obtained from a study of the drawings, disclosure and the appended claims.

What is claimed is:

1. A method of dampening a pressure flow between a pilot operated control valve connected with a control device and a resolver in a fluid control system having a supply of hydraulic fluid capable of being pressurized, comprising the step of:

locating a first orificing device having a plurality of steps therein directly in the hydraulic fluid flow between the pilot operated control valve and the resolver;

locating a second orificing device having a plurality of steps therein directly in the hydraulic fluid flow between a second pilot operated control valve and the resolver;

moving the control device in a first direction to control a first function with the first pilot operated control valve and moving the control device in a second direction to control a second function different than the first function with the second pilot operated control valve; and varying the size or shape of the respective plurality of steps to change the dampening effect on the pressure flow between the first and second pilot operated control valves and the resolver to dampen the flow of pressurized hydraulic fluid through the first and second orificing devices and obtain independent control for the functions of the first and second pilot operated control valves.

2. The method of dampening the pressure flow of claim 1, wherein the step of locating the orificing device includes the step of:

threading the first and second orificing devices into a port disposed within a housing for the first and second pilot operated control valves.

3. The method of dampening the pressure flow of claim 1, including the step of:

manufacturing a precision edge on each of the first and second orificing devices that cooperates with the respective plurality of steps to minimize the viscous drag through the first and second orificing devices.

4. The method of dampening the pressure flow of claim 3, wherein the step of manufacturing a precision edge includes the step of: manufacturing the thickness of the precision edge to 0.16 mm±0.04 mm.

5. A fluid control system having a supply of hydraulic fluid capable of being pressurized, comprising:

a control device;

at least two pilot operated control valves in connection with the control device, the pilot operated control valves being actuated by the control device;

a resolver in connection with the pilot operated control valves for receiving the respective pressure flow therefrom; and a first orificing device located directly between one of the pilot operated control valves and the resolver, the first orificing device including at least two stepped openings therein for dampening the pressure flow between the one of the pilot operated control valves and the resolver to achieve a first predetermined flow response from the control device; and a second orificing device located directly between the other of the pilot operated control valves and the resolver, the second orificing device including at least two stepped openings therein for dampening the pressure flow between the other of the pilot operated control valves and the resolver to achieve a second predetermined flow response from the control device that is different than the first predetermined flow response.

6. The fluid control system of claim 5, including a housing for enclosing the at least two pilot operated control valves, the housing defining at least two ports therethrough and the first and second orificing devices being threaded into a portion of the respective port.

7. The fluid control system of claim 5, including a precision edge located between the at least two stepped openings to control the flow of pressurized hydraulic fluid between the at least two pilot operated control valves and the resolver.

8. The fluid control system of claim 7, wherein each of the precision edges have a thickness of 0.16 mm±0.04 mm to define a sharp edge shape formed by an abutment with the at least two openings.

9. The fluid control system of claim 7, wherein each of the precision edges have a width less than the respective at least two openings.

10. The fluid control system of claim 7, wherein the size or shape of each of the at least two openings is different from one another.

* * * * *